US010574911B2

(12) United States Patent
Dvir

(10) Patent No.: US 10,574,911 B2
(45) Date of Patent: Feb. 25, 2020

(54) MULTISPECTRAL IMAGING APPARATUS

(71) Applicant: AGROWING LTD., Rishon LeZion (IL)

(72) Inventor: Ira Dvir, Rishon Lezion (IL)

(*) Notice: Subject to any disclaimer, the term of this patent is extended or adjusted under 35 U.S.C. 154(b) by 0 days.

(21) Appl. No.: 15/736,318

(22) PCT Filed: Jun. 15, 2016

(86) PCT No.: PCT/IL2016/050628
§ 371 (c)(1),
(2) Date: Dec. 14, 2017

(87) PCT Pub. No.: WO2016/203470
PCT Pub. Date: Dec. 22, 2016

(65) Prior Publication Data
US 2018/0176488 A1  Jun. 21, 2018

Related U.S. Application Data

(60) Provisional application No. 62/274,810, filed on Jan. 5, 2016, provisional application No. 62/260,272, filed on Nov. 26, 2015, provisional application No. 62/175,450, filed on Jun. 15, 2015.

(51) Int. Cl.
| | |
|---|---|
| H04N 5/33 | (2006.01) |
| G02B 13/14 | (2006.01) |
| G02B 23/18 | (2006.01) |
| G03B 17/14 | (2006.01) |
| G06T 3/00 | (2006.01) |
| H04N 5/225 | (2006.01) |
| H04N 5/238 | (2006.01) |

(52) U.S. Cl.
CPC ............ *H04N 5/332* (2013.01); *G02B 13/14* (2013.01); *G02B 13/146* (2013.01); *G02B 23/18* (2013.01); *G03B 17/14* (2013.01); *G06T 3/0068* (2013.01); *H04N 5/2256* (2013.01); *H04N 5/238* (2013.01)

(58) Field of Classification Search
CPC ...... H04N 5/332; H04N 5/238; H04N 5/2256; G06T 3/0068; G02B 13/146; G02B 23/18; G02B 13/14; G03B 17/14
USPC .................... 348/335, 340, 345, 348.35, 352
See application file for complete search history.

(56) References Cited

U.S. PATENT DOCUMENTS

| | | | | |
|---|---|---|---|---|
| 2004/0199785 | A1* | 10/2004 | Pederson | G07C 9/00158 340/293 |
| 2010/0149389 | A1* | 6/2010 | Goto | G02B 7/34 348/280 |
| 2012/0249744 | A1* | 10/2012 | Pesach | H01L 27/14621 348/46 |

(Continued)

*Primary Examiner* — Yogesh K Aggarwal

(57) ABSTRACT

A lens compound for connecting to an interchangeable lens mount of a digital camera having a single image sensor, the lens compound including a body; a single mount connecting ring mounted on the body for connecting to the lens mount of the digital camera; at least two lenses of substantially identical focal length mounted in the body; and a different single or multi bandpass filter associated with each of the lenses, allowing the passage of at least one visible band and one non-visible band, selected from the group consisting of near infra-red bands and ultra violet bands of light, through the filters to the sensor; wherein the lenses are of substantially identical field of view and substantially identical image circle at a sensor plane of the image sensor.

39 Claims, 12 Drawing Sheets

(56) References Cited

U.S. PATENT DOCUMENTS

| | | | |
|---|---|---|---|
| 2013/0111464 A1* | 5/2013 | Markas | G06F 8/41 |
| | | | 717/174 |
| 2013/0169754 A1* | 7/2013 | Aronsson | H04N 5/23212 |
| | | | 348/46 |
| 2014/0063224 A1* | 3/2014 | Suzuki | H04N 7/18 |
| | | | 348/79 |
| 2014/0168357 A1* | 6/2014 | Venable | G03B 37/04 |
| | | | 348/38 |
| 2016/0124180 A1* | 5/2016 | Chern | G02B 13/008 |
| | | | 348/164 |
| 2016/0136816 A1* | 5/2016 | Pistorino | B25J 9/1697 |
| | | | 53/203 |

* cited by examiner

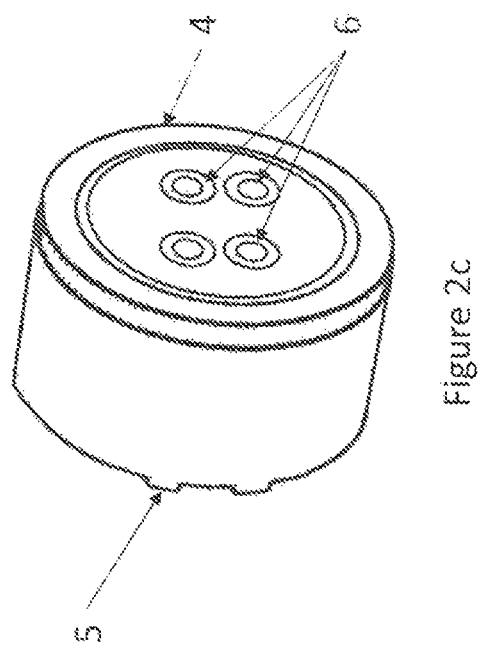

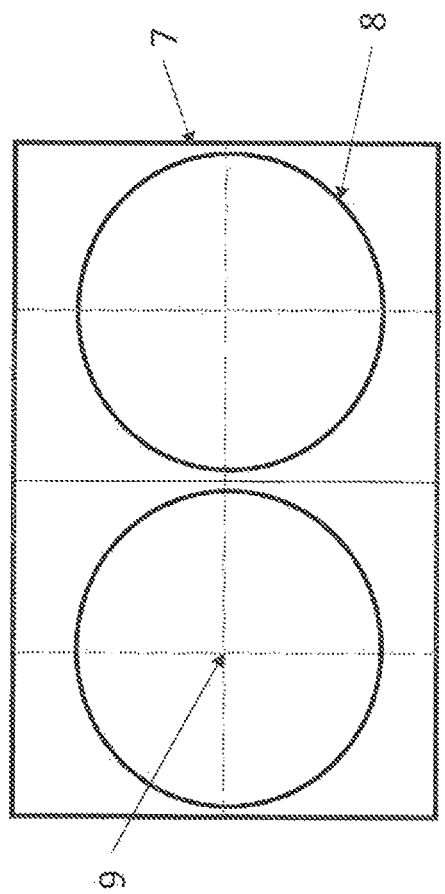

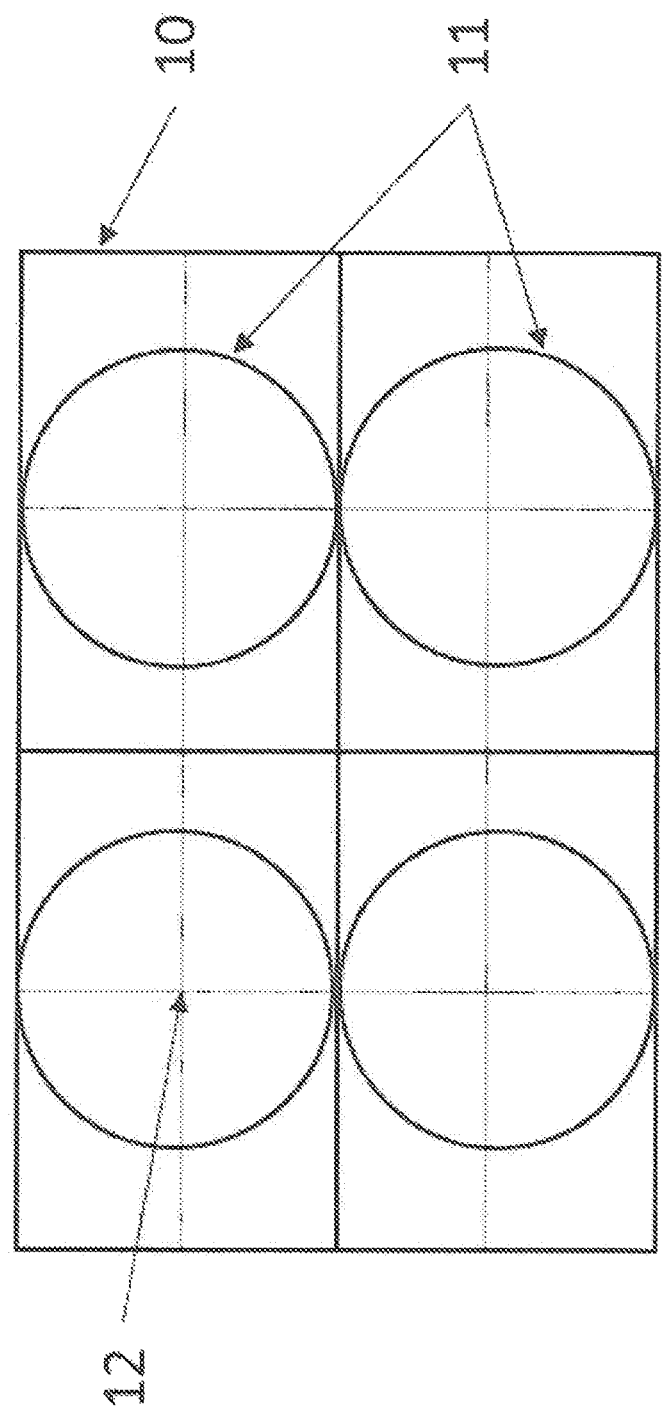

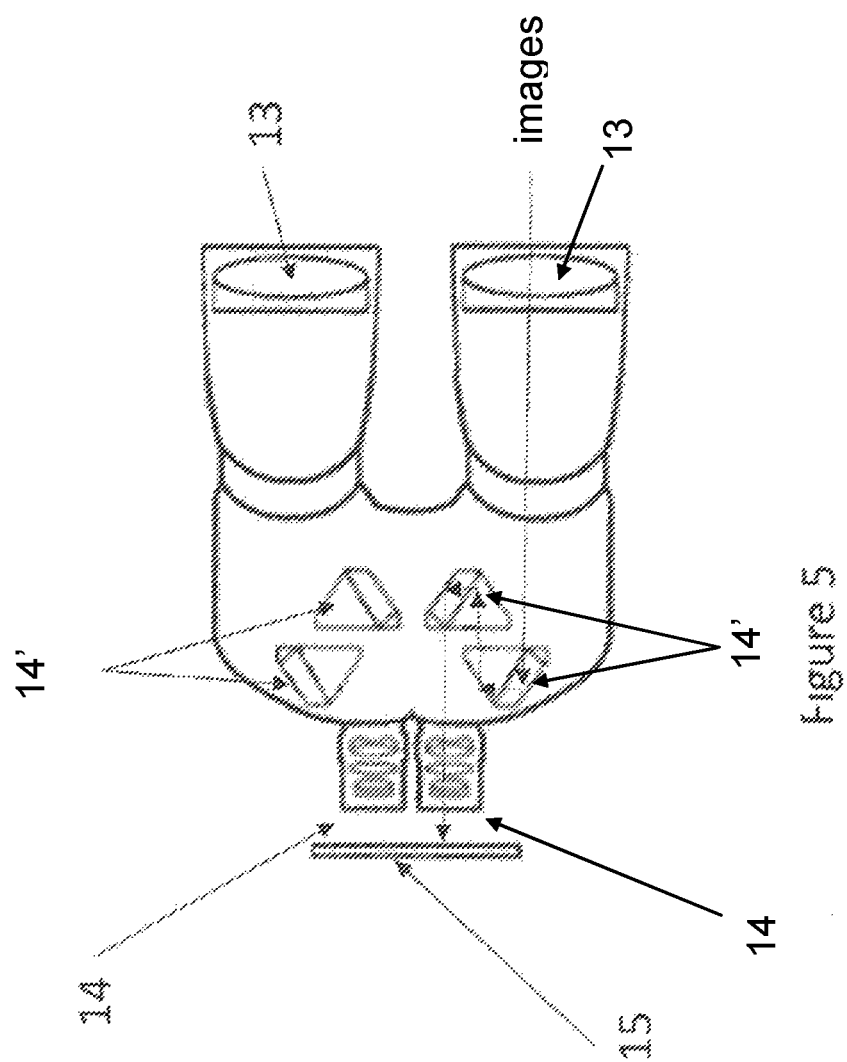

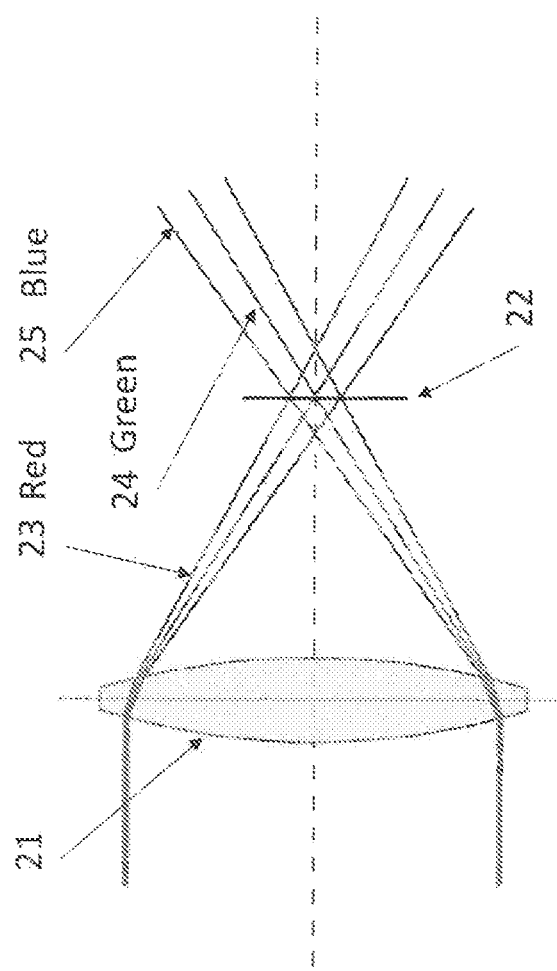

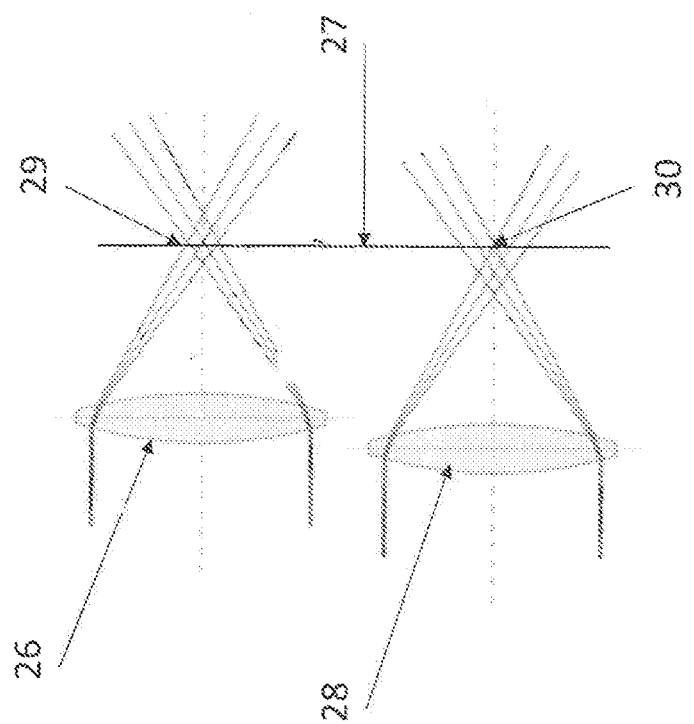

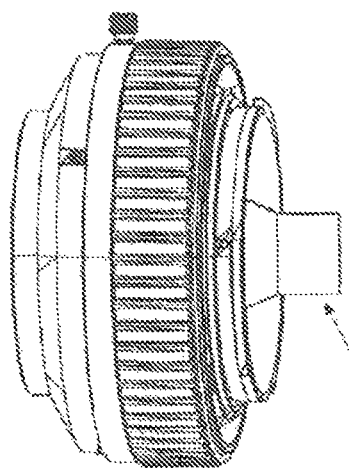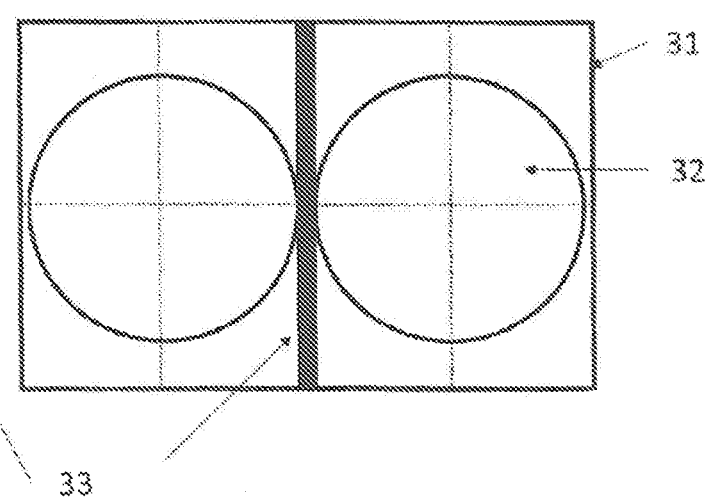
Figure 9a                    Figure 9b

MULTISPECTRAL IMAGING APPARATUS

RELATED APPLICATIONS

This application is a 35 USC § 371 National Stage application of International Patent Application number PCT/IL2016/050628, having an international filing date of Jun. 15, 2016 (now pending), which claims the benefit of U.S. Provisional Patent Applications No. 62/175,450 filed on Jun. 15, 2015, No. 62/260,272 filed on Nov. 26, 2015, and No. 62/274,810 filed on Jan. 5, 2016. The disclosure of each of the prior applications is considered part of and is incorporated by reference in the disclosure of this application.

FIELD OF THE INVENTION

The present invention relates to cameras, in general and, in particular, to a multispectral imaging apparatus for capturing multispectral images.

BACKGROUND OF THE INVENTION

Multi spectral imaging is used in many different applications and fields.

FIG. 1 shows a conventional DSLR (Digital Single-Lens Reflex) camera 1. The CCD (Charge-Coupled Device) and CMOS (Complementary Metal-Oxide-Semiconductor) sensors 3 of today's consumer grade DSLR and Mirrorless cameras are sensitive to a "full spectrum", which is usually from about 170 nm to 1150 nm. This sensitivity of CCD and CMOS sensors exceeds human perception, which is limited to visible light of about 400 nm to 700 nm.

In some DSLR/Mirrorless cameras with an interchangeable lens mount 2, the sensors are sensitive to the spectrum of light beyond human perception. However, most camera manufacturers use a UVIR cut filter (not shown), which is installed in front of the sensor, to block infrared and ultraviolet light from "corrupting" the captured images, limiting the passage of the band of light in the visible (VIS) spectrum from about 400 nm to 700 nm (the spectrum of light visible to the human eye).

In some DSLR/Mirrorless cameras with an interchangeable lens mount, the UVIR cut filter can be removed from the camera, allowing the camera to operate as a "full spectrum" camera, covering wavelengths of light far exceeding the visible light. The most advanced CMOS sensors of today are sensitive to light beyond 1000 nm (NIR) and 200 nm (UV). The removal of the filter allows capturing of three different and distinctive bands of the spectrum using a single lens. One can install different multi bandpass filters allowing the capture of one of four combinations of three bands: NIR or red and green and blue or UV (NIR;G;B, NIR;G;UV, R;G;UV, R;G;B). The typical sensor of a consumer camera is based on a Bayer matrix, which means that the arrangement of color filters on the pixel array of an image sensor is of RGGB. Such an arrangement does not allow capturing more than three distinctive bands of the RGB spectrum, as there is no efficient way of separating more than a single band in the green wavelength.

Conventional multi spectral cameras are usually custom built, and their high cost presents a barrier for many. Still, multispectral cameras mounted in drones are used in agriculture to capture images that provide useful information to a farmer which helps him improve the yield of his crops. Such cameras are also used for medical analysis by dentists and dermatologists, and even in the world of cosmetics. The existing art varies, as there are a few types of technologies for multi spectral cameras:

1. Multi-cameras (each camera acquiring a narrow band wave of light);
2. Prism based camera (single lens, multi sensors);
3. Rotating filter camera (single focal length, time lapse between captured images of different wavelengths);
4. Multi-color sensor based RGBU (Red Green Blue UV) or any other color capturing by the sensor (instead of the typical RGGB (Red Green Green Blue) of a Bayer color filter array).

There are known quite a few simplified dual-band solutions, which include a Visual (400 nm to 700 nm wide) band and a Near Infra-Red band, using two synchronized cameras, but they cannot be considered as multi spectral. Conventional 4 bands solutions, whether based on a revolving filter, prism or multi lenses design, are of rather low quality, due to low resolution and poor color channels aligmnent. All the multispectral camera types detailed above are very expensive and usually of low resolution and inferior quality when compared to consumer grade DSLR or Mirrorless cameras. Existing multi-camera and multi-lens solutions also present great challenges regarding the alignment of the different color matrices and the focus of the captured images. When a rotating filter is used, for example, it is almost impossible to correct the chromatic aberration, as the lens is fixed, which makes it impossible to focus bands of light of Near Infrared (NIR) and UV through the same lens. Using a camera with such a rotating filter on an unmanned aerial vehicle (UAV) presents another challenge. Since the images are captured at different times and from different angles while the UAV is flying, a time lap of 33 ms between captured images could result in ~1 m difference in the point of view of the camera, if the UAV is flying at 100 Kmph.

An effective multi spectral apparatus for agricultural analysis must include at least 3 narrow color bands (channels) of the spectrum of light: 550 nm; 650 nm or 740 nm; 850 nm or 950 nm and, preferably includes 5 or 6 color bands.

The sensors of today's consumer grade cameras, whether CMOS or CCD, are capable of capturing a rather broad spectrum of light, which is sufficient for many multi-spectral applications, such as NDVI (Normalized Difference Vegetation index) used in agriculture. However, the typical sensor of a consumer grade camera is based on a Bayer matrix sensor, which means that the arrangement of color filters on the pixel array of the image sensor is of RGGB. In order to use a Bayer filtering system based camera to capture 4, 5 or 6 channels, two cameras must inevitably be used. Combining two cameras for this kind of application is known, and was carried out and published by the USDA in "An Airborne Multispectral Imaging System Based on Two Consumer-Grade Cameras for Agricultural Remote Sensing" http://www.mdpi.com/2072-4292/6/6/5257. Such a combination is expensive and has quite a few disadvantages.

Some of the main challenges of multi spectral imaging are calibration and pixel alignment of the different color matrices, especially if these are acquired by different cameras. While the time of acquisition could vary by just few hundredths of a second, there could be a gap of tens of centimeters in the point of view. Analysis of data acquired through multi spectral applications, which make use of fast moving cameras, such as cameras borne by UAVs, use metrics like NDVI or NDRE, which typically subtract and/or divide values of the color matrices from one another ((NDVI=(NIR−VIS)/(NIR+VIS)). Thus, using multiple cameras in such applications is especially problematic, since differences between the focal points and inaccurate alignment can lead to false analysis of the data.

Alignment of the different color matrices is one of the most essential issues facing manufacturers of multi-spectral cameras. As stated above, NDVI and NDRE metrics and the like involve an analysis of the differences between color matrices. Hardware calibration of the cameras or lenses, which capture the different color matrices, is accurate to a certain point, but it can never be pixel accurate when dealing with high resolution cameras. When dealing with cameras with short effective lenses, it is even more challenging to align the color channels, which are acquired by the different cameras. Post-acquisition digital alignment of the matrices, based on the usually used metric of minimal difference, could be detrimental to the process, as digital matching (such as implementing global motion estimation techniques) is bound to align the different color matrices at the point of minimal difference between such matrices. Such techniques could actually minimize or even diminish the most important data, namely, the difference between the matrices.

Multi spectral imagery acquisition is also used for medical analysis by dentists and dermatologists, for skin analysis, dental inspection and more, and even in the world of cosmetics. However, current devices on the market for these implementations are also rather expensive and have two major shortcomings (in addition to their cost): Weight and User Accessibility. The current devices are expensive in consumer and small business terms, as they are custom built. An effective multi spectral apparatus for skin, hair and teeth analysis must include at least 3 narrow color bands (channels) of the spectrum of light: 365 nm; 550 nm; 650 nm. Preferably, it includes 5 or 6 color bands.

Removal of the UVIR cut filter is often used to modify the camera to an Infrared or Ultraviolet camera, for astronomic, medical or aesthetic purposes. Installing a multi bandpass filter on such a full spectrum camera may allow capture of three distinctive bands, as the sensor which is used in such cameras has, in most cases, a matrix of RGGB. This means that R, G, and B (red green blue) channels can be captured separately, but there is no way of capturing red and near infrared channels separately, as they are both captured by the same sensitive-to-red pixels of the sensor.

There are also solutions for capturing 3D images using two lenses with a single or dual sensor camera. Such a solution was developed by Zeiss almost a hundred years ago and a newer version of such a solution was developed also by Panasonic around 2010, for the consumer electronics market (for what seemed to be the rise of 3D TV). However, these solutions do not deal with the multispectral challenges of exposure balance, chromatic aberration and aligned focus, since they are based on identical lenses and identical spectral bandwidth, where such issues do not arise.

Mobile platforms like Smartphones, or similar universal processing boards designed for drones (such as Qualcomm's SnapDragon Flight) could be ideal in terms of pricing, weight and integration with a powerful processor, as the foundation for a multi spectral imagery apparatus. The sensors of today's Smartphones are capable of capturing a rather broad range of light, which is sufficient for many multi-spectral applications, such as NDVI (Normalized Difference Vegetation Index) used in agriculture. Some of these designs (like the SnapDragon Flight) include a single camera, and in recent years, vendors like LG Electronics even designed a 3D imagery capturing Smartphone, equipped with two cameras. However, there is no available multi spectral Smartphone, either for agricultural remote sensing, or for skin, hair and dental analysis. This is hardly surprising, as there are quite a few challenges which require an innovative approach in order to enable an efficient embodiment of such a light and compact apparatus.

However, the typical sensor of a consumer camera is based on a Bayer matrix, which means that the arrangement of color filters on the pixel array of an image sensor is of RGGB. In order to use a Bayer filtering system based camera for 4, 5 or 6 channels, the use of two cameras is inevitable. Combining two cameras for this kind of application is known, and was carried out and published b the USDA in "An Airborne Multispectral Imaging System Based on Two Consumer-Grade Cameras for Agricultural Remote Sensing" http://www.mdpi.com/2072-4292/6/6/5257. Such a combination is not practical for light UAVs and consumers due to its heavy weight and cost.

The very same challenges are relevant to skin analysis, where rather than VIS+NIR channels, VIS+Near UV are used for surface and under skin observation. The same challenges of the chromatic aberration and focus arise in this implementation One additional challenge for a skin analyzing Smartphone or mobile device is the lens type. For skin analysis purposes, one of the multiple cameras should be able to capture a narrow band of (peak) 365 nm. Simple glass lenses do not allow the transmission of such a band and a different material, such as fused quartz or fused silica, must be used for the NUV lens.

Accordingly, there is a long felt need for a multispectral imaging apparatus suitable for use as a fast moving or UAV borne camera, or as a skin analysis device, and it would be very desirable if such a camera provided alignment of the different color matrices and focus of the captured images, all at a relatively low cost.

SUMMARY OF THE INVENTION

The present invention relates to an interchangeable multi-spectral imaging lens-compound for a digital camera having an interchangeable lens mount. The lens-compound includes a body having a single mount connecting ring and at least two lenses. Each lens is positioned (preferably exactly) in front of the center of the portion of the sensor associated with that lens, according to the number of lenses. The different lenses allow the passage of a plurality, preferably at least four, different bands of light of the spectrum from IR to UV, thus enabling—by using bandpass filters—sensing of selected bands of defined wavelengths of the spectrum, selected according to the application. The lenses are of substantially identical field of view and similar (substantially identical) image circle at the sensor plane. The lenses are also of substantially identical focal length and are either positioned at unequal distances from the sensor, or one or more of the lenses includes an optical element to correct the chromatic aberration, which is created due to the different wavelengths of the light passing through the different lenses.

In particular, the lens-compound enables capturing of multi spectral images through multiple (two or more) lenses, preferably using an industry standard single lens mount. The lens-compound enhances a single digital camera equipped with a standard image sensor (which preferably has no UVIR cut filter, and is sensitive to the full spectrum of light from ~170 nm to ~1100 nm, like most modern CMOS or CCD sensors), turning it into high quality, highly synchronized and aligned multi-spectral camera.

Thus, the current invention allows capturing multi spectral images of four to twelve and even more bands, through multiple (two or more) lenses, using a single lens mount with a single digital camera equipped with a standard image sensor. Furthermore, the current invention allows optimal use of the full surface of the camera's sensor, while filtering out overlapping parts of the images which are captured by the different lenses.

There is provided according to the present invention a lens compound for connecting to an interchangeable lens mount of a digital camera having a single image sensor, the lens compound including a body; a single mount connecting ring mounted on the body for connecting to the lens mount of the digital camera; at least two lenses of substantially identical focal length mounted in the body; and a different single or multi bandpass filter associated with each of the lenses, allowing the passage of at least one visible band, and one non-visible band selected from the group consisting of near infra-red bands and ultra violet bands of light, through the filters to the sensor; wherein the lenses are of substantially identical field of view and substantially identical image circle at a sensor plane of the camera.

There is also provided, according to the invention, a method for capturing multi spectral images, the method including capturing images on a single image sensor through at least two lenses of substantially identical focal length, wherein the lenses are of substantially identical field of view and substantially identical image circle at a sensor plane; each lens being associated with a different single or multi bandpass filter; passing at least one visible band, and at least one non-visible band selected from the group consisting of near infra-red bands and ultra violet bands of light, through the filters to the sensor; and saving the captured images from the multiple lenses in a single image file.

There is also provided, according to the invention, a multi-spectral camera including: a digital camera having an interchangeable lens mount, a shutter and a single sensor; and a replaceable lens compound including: a body; a single mount connecting ring mounted on the body for connecting to the lens mount of the digital camera; at least two lenses of substantially identical focal length mounted in the body, each the lens mounted with its focal center disposed in front of the center of its respective portion of the sensor; a different single or multi bandpass filter associated with each of the lenses, allowing the passage of at least one visible band, and at least one non-visible band selected from the group consisting of near infra-red bands and ultra violet bands of light, through the filters to the sensor; wherein the lenses are of identical field of view and substantially identical image circle at a sensor plane of the camera;

The present invention also relates to a method for providing post-acquisition digital alignment of at least a pair of digital images of an object, the method including acquiring digital images of the object, stored as color matrices, through each of at least two lenses of substantially identical focal length, of substantially identical field of view and substantially identical image circle at a sensor plane of at least one sensor, each lens being associated with a single or multi bandpass filter, such that each lens captures one light band similar to one light band captured by the other lens and at least one light band different from the light bands captured by the other lens, splitting the color matrix which was captured by the similar light band from the multi-band images acquired by the different lenses, and matching the substantially identical light band matrices from each lens for post-acquisition digital alignment of the images acquired by all the lenses.

According to embodiments of the invention, the filters allow the passage of at least a visible and a non-visible band of light through the filters to the sensor. A flash light, which can be a dedicated flash light, matching the pass band of the non-visible filter, is arranged to illuminate the object during imaging.

There is further provided, according to the invention, an apparatus for providing post-acquisition digital alignment of at least a pair of digital images of an object, the apparatus including at least two lenses of substantially identical focal length, of substantially identical field of view and substantially identical image circle at a sensor plane, for acquiring color matrices of digital images of an object through each lens, each lens being associated with a single or multi bandpass filter which includes one similar light band and at least one different light band, and a processor for splitting the color matrix which was captured by the similar light band from the multi-band images acquired by the different lenses and matching the substantially identical light band matrices from each lens for post-acquisition digital alignment of the images acquired by all the lenses.

It will be appreciated that the lenses can be mounted on a single camera or on two or more different cameras.

The present invention further relates to a mobile multi-spectral imaging apparatus having multiple lenses and/or multiple sensors and/or multiple cameras for capturing multispectral images, In particular, the mobile imaging apparatus is configured to permit digital alignment of color channels in the multispectral images. The cameras (at least two) are positioned and aligned to capture fields of view that are as identical as possible. The different cameras allow the passage of a plurality, preferably at least four, different bands of light of the spectrum from Red to Near UV or from Blue to Near IR, thus enabling—by using bandpass filters—sensing of selected bands of defined wavelengths of the spectrum, depending on the application. The cameras are of substantially identical field of view and substantially identical image circle at their sensor's plane. The lenses of the cameras are also of substantially identical focal length and of low distortion. At least one dedicated flash light is provided for illumination in the sensitive range matching the non-visible (e.g., Near UV or the NIR) filter, although a second flash illuminating the visual bands will preferably be installed In order to achieve the substantially identical image circles at the sensor's plane, the lenses of the cameras are either positioned at unequal distances from the sensor, or at least one of the lenses includes an optical element to correct the chromatic aberration, which is created due to the different wavelengths of the light passing through their different lenses.

Thus, there is provided, according to the present invention, a multispectral imaging apparatus including a mobile processing platform; at least two cameras, each including a lens, at least one single or multi bandpass filter, and at least one sensor, integrated with the platform; wherein the filters allow the passage of at least a visible and a non-visible (e.g., near infra-red or near ultra violet) band of light through the filters to the sensors; and wherein the lenses are of substantially identical focal length, substantially identical field of view and substantially identical image circle at a sensor plane of the camera. The different cameras allow the passage of a plurality, preferably at least four, different bands of light of the spectrum from Red to Near UV or from Blue to Near IR. At least one dedicated flash light is provided for illumination in the sensitive range matching the non-visible (e.g., Near UV or the NIR) filter, although a second flash illuminating the visual bands will preferably also be installed.

According to embodiments of the invention, each of the lenses includes a filter to capture at least one similar color band of the spectrum, enabling post-acquisition digital alignment of different color channels in the captured images, where similar means at least 50% overlap.

BRIEF DESCRIPTION OF THE DRAWINGS

The present invention will be further understood and appreciated from the following detailed description taken in conjunction with the drawings in which:

FIG. 3 is a schematic illustration of a sensor, according to some embodiments of the invention;

FIG. 4 is a schematic illustration of a sensor, according to alternative embodiments of the invention;

FIG. 5 is a schematic top view of another lens design for a multispectral camera, according to some embodiments of the invention;

FIG. 7 is a schematic illustration of chromatic aberration;

FIG. 8 is a schematic illustration of chromatic aberration correction of a pair of lenses, according to some embodiments of the invention;

FIGS. 9a and 9b are schematic front and side view illustrations, respectively, of a physical partitioning, which is placed between the two lenses, according to some embodiments of the present invention;

DETAILED DESCRIPTION OF THE INVENTION

Figure 1:
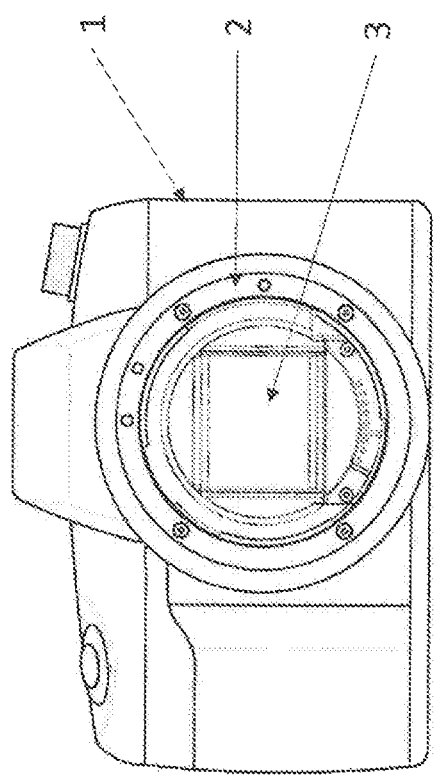
FIG. 1 is a schematic illustration of a prior art DSLR camera with a lens mount.

The present invention relates to an interchangeable multispectral imaging lens-compound for a digital camera that has an interchangeable lens mount. The lens-compound includes a body with a single mount connecting ring and at least two matching lenses. The lenses are positioned (preferably exactly) in front of the center of the portion of the sensor associated with each lens, according to the number of lenses. The different lenses allow the passage of a plurality, preferably at least four, different bands of light (at least 4 bands for 2 lenses) of the spectrum from NIR to Blue and possibly near UV, thus enabling—by using bandpass filters—sensing of selected bands of defined wavelengths of the spectrum, selected according to the desired application. The lenses are of substantially identical field of view and substantially identical image circle at the sensor plane. The lenses are also of substantially identical focal length and are either positioned at slightly different distances from the sensor, or at least one of the lenses includes an optical element which corrects the chromatic aberration created due to the different wavelengths of the light passing through the different lenses. Preferably, substantially identical in this case means at least 90% identical. It will further be appreciated that, according to embodiments of the invention, the lenses can be of substantially identical field of view and/or substantially identical image circle and/or of substantially identical focal length, or any combination.

In particular, the lens-compound enables capturing of multi spectral images through multiple (two or more) lenses, preferably using an industry standard single lens mount (such as Nikon's F-mount or Sony's E-mount or Panasonic/Olympus Micro Four Thirds or C-Mount, or any similar DSLR or mirrorless digital camera mount). The lens-compound enhances a single digital camera equipped with a standard image sensor (which preferably has no UVIR cut filter, and is sensitive to the full spectrum of light from ~170 nm to ~1100 nm wavelengths, like most modern CMOS or CCD sensors), turning it into a high quality, highly synchronized and aligned multi-spectral camera.

The narrow or wide bandpass and/or multiple bandpass filters associated with the lenses are different for each lens. They can be implemented as a coating on the lens, or can be interchangeable and mounted in front of the lens (between the object and the lens), or behind it (between the lens and the portion of the sensor which senses the light passing through that particular lens), all as known, or in any other suitable manner.

The multiple lenses can be of fixed focus or can have an adjustable focus. In the case of adjustable focus, a single focus mechanism, automatic or manual, is provided to adjust the focus of all the multiple lenses by moving, together, the optical elements of the multiple lenses which need to be moved.

According to some embodiments, the multiple lenses can be zoom lenses. In such a case, whether automatic or manual zoom, the zoom of all the multiple lenses' elements, which need to be moved in order to produce the zooming effect, are moved together.

In order to achieve equalized exposure to the different parts of the sensor (since the invention utilizes a single camera), the apertures of the different lenses are preset or manually set according to the acquired wavelength. This is required because the images are acquired at the same exposure time. (For example, if the lenses are capturing a NIR image of 850 nm to 950 nm and a visible image of 400 nm to 700 nm, a difference in aperture (F-stop) may be required in order to get equalized exposure. If the VIS lens has F8, then it is most probable that the NIR lens capturing a substantially identical field of view and focal length will be using F5.6).

The images from the multiple lenses are saved in a single image file, whether in RAW, PEG or any other format supported by the camera.

According to some embodiments, optimal and maximal use of the full surface of the camera's sensor is provided, while filtering out overlapping parts of the images which are captured by the different lenses. This preferably is accomplished by masking and/or a physical partitioning. Preferably, the invention includes a light blocking frame, border or partition around each lens or between the lenses, limiting or cropping the circle of light which comes through each lens to the size of a pre-defined rectangular space on the camera's sensor. The size of this space is determined according to the number of lenses installed on the mount.

Since the applications, which can benefit from the multispectral images, analyze the images while comparing the color matrices to one another, it is essential that the different matrices be identical in their field of view and resolution. Since the lenses allow the passage of selected and limited bands of light, the current invention discloses ways to correct the chromatic aberration which is caused by the different angles that the bands of light take while passing through identical lens substance (whether glass or plastics). The current invention discloses two possible ways of solving this issue without requiring post acquisition processing of the acquired images. One suggested way of solving the aberration issue is to design the lenses based on identical image circles and fields of view, while designing the optical elements to fit these two specifications. The aberration correction can be accomplished, in such a case, either by using slightly different lenses in terms of focal depth, or by adding an optical element in one or both lenses, which corrects the aberration (aligns the size of the image circle of one lens with that of the other lens). It is also possible to use a combination of both these solutions.

In addition, the current invention proposes a method of post-acquisition aligning of different color matrices in a most reliable way, that no conventional multi-lens multi-spectral camera is capable of offering. The current invention allows pixel accurate alignment of the matrices, by capturing one of the color bands through both lenses and aligning all the matrices according to the post-acquisition digital alignment, which is based on the matching of these two similar color matrices. For example, if lens 1 captures 60 nm wide bands, the center of which are 450 nm, 550 nm and 650 nm, and lens 2 captures 60 nm wide bands of 550 nm and 850 nm, then the post-acquisition digital alignment will be done by matching the 550 nm images of lens 1 and lens 2, which will allow pixel accurate alignment, as these matrices contain similar data. This is accomplished by acquiring images by each of the lenses, through filters which include a similar light band. The matrix or channel which received the similar light band is split from the multi-band images acquired by the different lenses, as by a processor. Then, the similar light band matrix is utilized for post-acquisition digital alignment of the images acquired by all the lenses. For purposes of the present invention, similar means color matrices of a substantially overlapping (at least 50%) spectral wavelength.

All the other matrices will then be aligned accurately, as they were captured simultaneously with the 550 nm on both halves of the sensor. It is possible, of course, to have a substantially identical band for such alignment using any of the RGB range bands, however the preferred choice is green, as usually the green color matrix is the sharpest of the three color ranges and most DSLR and Mirrorless cameras are equipped with the Bayer RGGB sensor, which ensures the highest quality for the green band.

It will be appreciated that this technique can also be used with multiple cameras (multiple sensors) on a single platform, and not just a single camera having multiple lenses on a single sensor. One example of such an implementation is described in detail below with regard to a mobile platform. Thus, the method for digital alignment of two or more captured images includes capturing images through at least two lenses, at least two filters allowing passage of a selected band of light through each of the lenses to at least one sensor, wherein the lenses are of substantially identical focal length, substantially identical field of view and substantially similar image circle at the sensor plane. One of the filters associated with each lens permits capture of at least one selected similar color band of the spectrum (at least 50% overlap), enabling post-acquisition digital alignment of different color channels in the captured images based on the matching of the similar band acquired by each lens.

In addition, the single camera implementations of the current invention disclose a way to bypass the lens diameter limitation. As the lenses have to be positioned exactly in front of their corresponding portion of the sensor, the diameter of the lens typically is limited by the sensor's size. If, for example, the dimensions of an APS-C sensor used by a certain camera are 23.2 mm×15.4 mm, then a dual lens compound seems to be limited to lenses of Ø11.6 mm. However, as the full diameter of the lenses allows the passage of light of the whole image circle, parts of which fall beyond the sensor (as the image circle is round and the sensor is rectangular), the current invention discloses a way of using lenses of larger diameter, while cropping the lenses' edges (or just the adjacent edges). This allows the use of lenses of up to Ø15.4 mm. Another way of using even larger diameter lenses is to use a double Porro prism design, as described in detail below, as is commonly used in binoculars, to allow use of even far larger objectives.

The lens compound may also be adjusted to a different mount using a lens adapter ring (for example, from F-mount to Micro Four Thirds or to E-mount or any other mount). Preferably, the lens compound allows independent focus calibration for each of its multiple lenses.

Also preferably, the camera has wireless capabilities (e.g., WiFi, NFC, Bluetooth and/or cellular LTE or other). If desired, the camera can be controlled via USB or wirelessly. Also preferably, the camera is capable of transferring captured images through wire (e.g., USB) and/or wirelessly to a processing platform (such as a computer, tablet, PC, image processing board, or a smartphone).

Figure 2A:
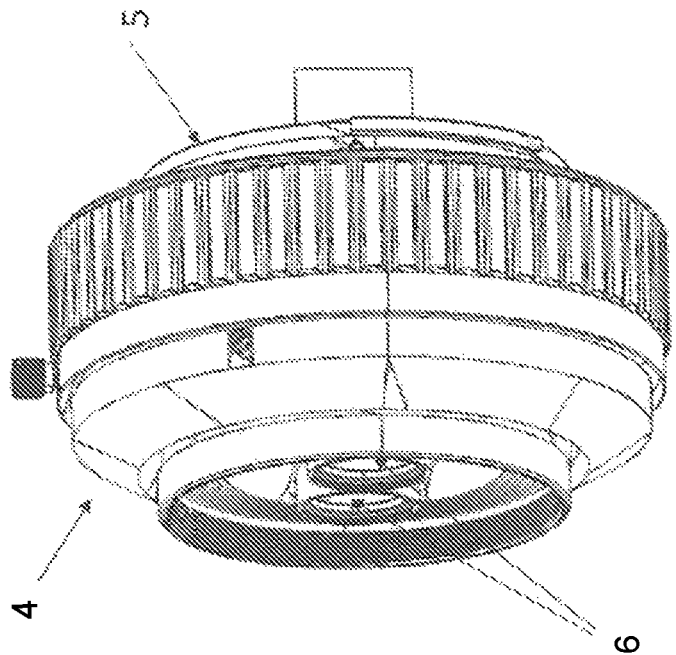
FIG. 2 is a schematic illustration of a lens compound according to some embodiments of the invention.
Figure 2B:
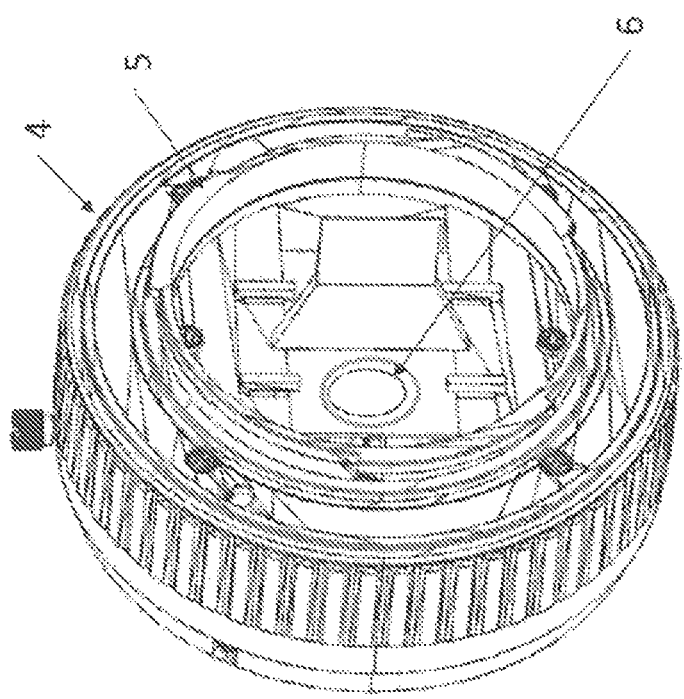

The current invention proposes an efficient way of using at least two lenses in a single lens compound, bypassing the RGGB limitation of the Bayer filter by dedicating at least two areas of the sensor space to at least two lenses that are designed to pass different bands of the spectrum. One exemplary embodiment is shown in FIGS. 2a and 2b. FIGS. 2a and 2b show a lens compound 4 having a lens mount 5 and a plurality of lenses 6 (here illustrated as two lenses). For example, as shown in this embodiment of the invention, if the lens compound includes two lenses, one of which has a multi bandpass filter of NIR, G and UV, and the other one has a multi bandpass filter of R, G, and B, the camera can capture at least 5 bands or even 6 bands, if the G bandpass filter of each lens allows a different narrow green wavelength through it. Using four lenses with a single sensor, as illustrated in FIG. 2c, will allow capturing up to 12 different bands using a single sensor.

The sensors of today's cameras are of rather high resolution (APS-C (Advanced Photo System type-C) sensors up to 24 and 28 MP; Full Frame sensor of 36 MP and even 50 MP). The resolution supported by these cameras is being enhanced and it is reasonable to assume that far higher resolutions will be supported by such cameras in the future. Similarly, the advance of the lens technologies and materials, as can be seen from many smartphone cameras, enables integrating small diameter lenses of high quality, which allow capturing of high resolution images.

The advance of lens coating and optical filtering technology allows creation of effective multi band-pass filters of light. However, acquiring different wavelength images on a single sensor on a single camera presents challenges in terms of balanced exposure, as described in detail below. For example, in some cases, the optimal F-stop for the IR capturing could be 1 or 2 stops (depending on the captured band) smaller than that of the visual image capturing.

The current invention allows the utilization of all these technologies, combining them for an effective and affordable solution of extremely high quality and accuracy, through innovative yet simple to implement solutions.

The current invention relates to a lens compound, which includes a body on which are mounted at least two lenses of substantially identical image circles and focal lengths. The lenses (for example 2, 3, 4, 5 or even 8) are designed to allow the passage of different bands of the spectrum through single or multiple bandpass filters, which are positioned in front of or between the lenses and the camera sensor, or in the form of coating on the lens, itself, (or on one of its optical components).

The lens compound according to the invention is mounted on a DSLR or Mirrorless camera, having an interchangeable lens mount, to form a highly accurate yet inexpensive multispectral camera. According to the current invention, multiple lens compounds can be used with a single camera, by interchanging lens compounds according to the user's needs and the particular application. A user can take multispectral images of 8 or 12 bands of the spectrum from a long distance, and then change the lens compound with a lens compound of longer focal depth for more detailed (closer) view with either the same bands or different bands. The flexibility of interchanging lens compounds, according to the current invention, allows better use of multispectral analysis of agricultural remote sensing, medical examination and other scientific applications.

According to the current invention, a full spectrum camera is used with the lens compound. Such a full spectrum camera exposes the camera's sensor to a wider spectrum than the visual spectrum either due to the lack of a UVIR filter, or due to the removal of such a filter, if it was originally installed by the manufacturer, or by replacing it by a filter that allows the passage of a wider range of the spectrum.

According to the current invention, at least two lenses are included in the lens compound. In order to achieve the closest possible match between images from the two (or more) lenses, and enable full use of the camera's sensor, a number of different arrangements of components are disclosed according to the current invention.

Most of the DSLR and Mirrorless cameras with interchangeable lens mounts have sensors of different sizes. The dimensions of 12, 16, 24 or 50 Mega Pixels can vary from sensors even smaller than 17.3 mm by 13 mm (Micro Four Thirds) up to sensors as large as 36 mm by 24 mm (Full Frame). A Sony Alpha 5000, for example, has an APS-C Sensor of 23.2 mm by 15.4 mm. In order to acquire two images as identical as possible through two lenses on the same sensor, it is preferable to set the lenses exactly in front of the sensor, when the focal center of each of the lenses is positioned exactly in front of the center of the portion of the sensor that corresponds to it. One example of such an arrangement is shown in FIG. 3. In FIG. 3, sensor 7 is shown with two lenses 8 thereon. Each lens 8 is mounted with its focal center in front of the center of its respective half of the sensor. The size of the sensor, thus, seems to present a real limitation to the size of the lenses that can be used, as (for example) if two lenses need to be used in front of a 23.2 mm by 15.4 mm sensor, it means that the maximal diameter of the lens can be no larger than 11.6 mm (half the horizontal size of the sensor). If four lenses are to be used, then the maximal diameter of the lenses can be no larger than 7.7 mm (half the vertical dimension of the sensor, utilizing 11.6 mm by 7.7 mm). See, for example, FIG. 4, showing four lenses 11 mounted on a single sensor 10, such that the focal center of each lens is in front of the center 12 of its respective quarter of the sensor.

In order for such an embodiment to be effective, each of the small lenses should present on the sensor an image circle of diameter of at least 13.923 mm (the diagonal dimension of 11.6 mm by 7.7 mm) to entirely cover its dedicated portion of the sensor. However, according to the current invention, such limitation can be overcome in at least two different ways. One way is to use a Porro prism design for each lens of the compound, as is often used in binoculars, and as illustrated in FIG. 5. The Porro prism design has offset prisms resulting in the familiar "bent" shape of many binoculars. Such design allows the use of far larger diameter objectives (of practically unlimited size), while the "eyepiece" of the Porro prism monocular is set in the interchangeable mount of the camera, facing the sensor. Thus, images captured through objective 13 pass through the Porro prisms 14' to the eye piece 14 and then to the sensor 15. This Porro prism design can alternatively be implemented in each of the other embodiments described herein.

Figure 6B:
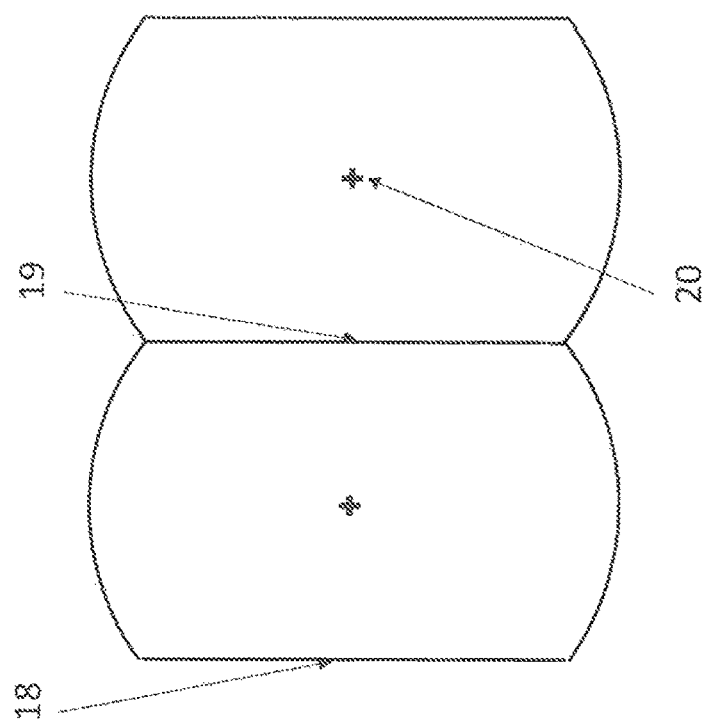
FIGS. 6a and 6b are schematic illustrations of possible lens arrangements according to some embodiments of the present invention.
Figure 6A:
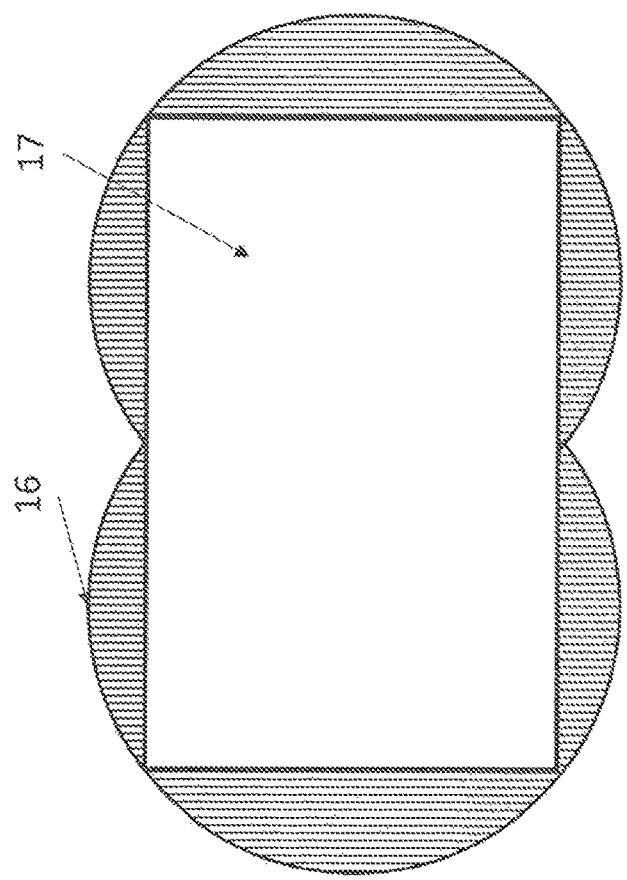

Another, and preferred way, according to embodiments of the current invention, is to crop the adjacent lenses. The edges of the image circles passing through the lenses will need to be cropped eventually, to prevent inefficient overlapping of the image circles on the sensor. By cropping the overlapping edges of the lenses, the current invention allows the use of lenses of larger diameter. This can be seen in FIG. 6a, which shows the use of lenses 16 which extend beyond the edges of sensor 17, permitting use of the entire surface area of the sensor. In FIG. 6b, the cropped lenses 16, themselves, can be seen. They are cropped along a matching cropping edge 19. As can be seen, the lens centers 20 are disposed above the center of the corresponding half sensor. In the illustrated example, for the same Sony APS-C Sensor of 23.2 mm by 15.4 mm, cropping the overlapping edges of two adjacent lenses enables the use of lenses with a diameter of up to 15.4 mm. With four lenses (not shown) fit into a single lens compound, lenses of diameter of up to 11.6 mm can be used. Thus, the current invention discloses effective ways to overcome the lens size limitation without compromising the positioning of the lenses in front of the centers of the corresponding portions of the sensor.

The current invention also discloses effective ways to balance the exposure levels of the different lenses which are included in the lens compound. As the exposure time cannot be set independently for each lens of the compound, and as the sensitivity of the sensor may vary when it is exposed to different narrow or wide bands of the spectrum, there could be a need to balance the exposure levels of the different lenses. For example, in such a case, in order to achieve balanced exposure and avoid over or under exposure of one or all of the images, the optimal F-stop for the IR capturing could be 1 or 2 stops (depending on the captured band) smaller than that of the visual image capturing (for example F8 Vs. F5.6 for VIS Vs. NR 800 nm and F11 Vs. F5.6 for VIS Vs. NIR 950 nm). If the exposure of the different lenses is not balanced, one captured image could be under exposed (too dark) or the other case of a dual lens compound) could be over exposed (overly bright). The current invention discloses three possible embodiments which solve the exposure balancing. The first option is a differential iris setting for each lens, i.e., setting a specific F stop for each lens according to the band that it lets through. According to this embodiment, a NIR 800 nm lens will have an F8 or F5.6 if its adjacent lens is of 3 VIS bands (between 400 nm-700 nm), while the VIS lens will be of F8 or F11.

A second solution, according to the current invention, is to add a Neutral Density coating or filter to the VIS lens. A Neutral Density filter reduces or modifies the intensity of all wavelengths or colors of light equally, giving no changes in hue of color rendition. Such a filter can be suited to reduce the intensity as desired to achieve the desired balance between the lenses. A more complex and expensive solution is to allow independent iris setting for each lens. This is a less preferred solution, as the iris is not fixed.

The current invention also proposes two practical ways of overcoming a major challenge of multi spectral capturing on a single sensor, which is chromatic aberration. Chromatic Aberration, also known as "color fringing" or "purple fringing", is a common optical problem. Chromatic aberration is caused by lens dispersion, with different colors of light travelling at different speeds while passing through a lens. This problem is illustrated schematically in FIG. 7. Here, it can be seen that lens 21 splits the light to three spectra—red 23, green 21 and blue 25. However, in the illustration, only the green light 24 is focused on the sensor at the focal plane 22. Chromatic aberration is especially severe when dealing with a broad range of the spectra. A lens capable of correcting and focusing images within the range of the visual spectrum (400 nm to 700 nm) will not be able to overcome the chromatic aberration of 200 nm to 850 nm and more. Although the multi lens compound lets the different bands of the spectrum through independent lenses and captures the images on different portions of the sensor plane, the chromatic aberration must be corrected to allow effective analysis of the captured images. A post acquisition software solution could be used to solve the problem, but it is less efficient than solving the problem beforehand.

The first way to correct the aberration is to use slightly different lenses in the compound, according to the band or bands of light which are passing through the lens. While the angle of view and the image circle of the lenses are kept identical, the lens design is altered to an identical focal depth. This can be done by any man of the art. A second way of solving longitudinal chromatic aberration is to embed the lenses in the compound on an uneven plane, i.e., at different distances from the sensor, as shown in FIG. 8. In this exemplary embodiment, a lens 26, passing green light, is disposed closer to the sensor 27, while a lens 28, passing red light, is disposed further from sensor 27. In this way, both the green focal point 29 and the red focal point 30 coincide with the focal plane of the sensor 27. This is a simple and practical way of solving the problem while using identical lenses, Setting a lens, which allows green and ultraviolet light through, at a closer distance to the sensor than a lens which allows near infrared light through, allows the capture of identical images in terms of dimensions and angle of view, which is so essential for the post acquisition analysis of the images.

In order to use the entire surface area of the sensor effectively, the current invention discloses a few ways of preventing the image circles coming through the lenses from overlapping and blending on the plane of the sensor. One way to block such blending is by using a physical partitioning, which is placed between the lenses, FIGS. 9a and 9b show one exemplary embodiment of a lens compound in respective front and side schematic views. Two lenses 32 are mounted on the lens compound in front of a sensor 31. A physical partition 33 is disposed between the lenses to reduce or prevent overlap of images captured on sensor 31. Such a thin partition or partitions (depending on the number of lenses in the lens compound), which are placed perpendicular to the sensor, exactly on the borders of the portions of the sensor that are dedicated to the lenses above these portions, prevent the blending and, in practice "crop" the image circles where a blending could occur. In some cases, where a camera's mechanical shutter is utilized between the lenses and the sensor, a combination of two or all the above described means for preventing overlap is preferable.

Figures 10A, 10B:
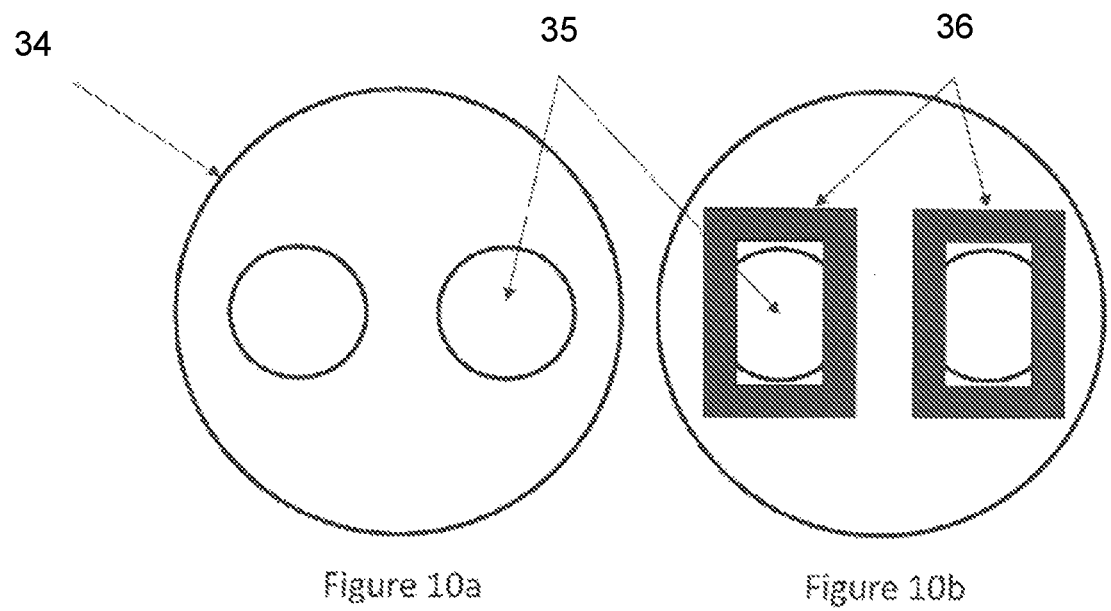
FIGS. 10a and 10b are schematic views of a lens compound with cropping windows, according to some embodiments of the present invention.

Another practical way of physically "cropping" the image borders which could blend is by coating on the lenses, or by a "window" between the lenses and the sensor. Such "windows" or rectangular coating prevent the light that can be blended from coming through to the sensor. One exemplary embodiment is shown in FIGS. 10a and 10b, showing a lens compound 34 with two lenses or eye pieces 35. In FIG. 10a, light coming towards one eye piece (the optical element which is closest to the sensor) has rays which enter the second eye piece, causing undesirable blending. According to embodiments of the present invention, as shown in FIG. 10b, cropping windows 36 have been added to prevent this blending.

As the images passing through the multiple lenses of the compound end up on different portions of the same single sensor, they are saved eventually side by side and/or top by bottom, or both, and saved in a single file, in any format (JPG, RAW, etc.) that is supported by the camera on which the lens compound is mounted.

The present invention also relates to a mobile multispectral imaging apparatus having at least two cameras integrated with a mobile processing platform for capturing multispectral images. Each camera includes at least one sensor, integrated with the platform, a lens, and at least one single or multi bandpass filter, permitting passage of at least a visible and a non-visible (near infra-red or near ultra violet) band of light through the filters to the sensors. The lenses are of substantially identical focal length, substantially identical field of view and substantially identical image circle at a sensor plane of the camera. The different cameras allow the passage of a plurality, preferably at least four, different bands of light of the spectrum from Red to Near UV or from Blue to Near IR. At least one flash light, preferably dedicated flash light is provided for illumination in the sensitive range matching the non-visible (e.g., Near UV or the NIR) filter. Preferably, a second flash illuminating the visual bands will be installed, as well. The imaging apparatus can be implemented with multiple lenses and/or multiple sensors and/or multiple cameras. Storage means is required for storing the captured images as two matching files or as a single file. Typically the processing mobile platforms and Smartphones are equipped with storage of different kinds: Internal and MicroSD. The invention is described hereinbelow with reference to cameras, although, alternatively, it can be implemented as at least two lenses with at least two filters mounted on at least one light collecting sensor.

In particular, the mobile imaging apparatus is configured to permit digital alignment of color channels in the multispectral images. The cameras (at least two) are positioned and aligned to capture fields of view that are as identical as possible. The different cameras allow the passage of a plurality, preferably at least four, different bands of light of the spectrum from Near IR to UV or Near UV, thus enabling—by using bandpass filters—sensing of selected bands of defined wavelengths of the spectrum, depending on the application. The cameras are of substantially identical field of view and substantially identical image circle at their sensor's plane. The lenses of the cameras are also of substantially identical focal length and of low distortion. In order to achieve the similarity of the image circles at the sensor's plane, the lenses of the cameras are either positioned at unequal distances from the sensor, or include an optical element to correct the chromatic aberration, which is created due to the different wavelengths of the light passing through their different lenses.

In particular, the combination of the two cameras enables capturing of multi spectral images by using two full spectrum cameras (without UVIR cut filter or coating) equipped with multi-bandpass filters, or by using one camera in the visual range (like 400 nm to 700 nm) and a second camera with no UV and/or IR cut filter or coating, which is sensitive to the full spectrum of light from ~350 nm to ~1000 nm, (like most modern CMOS Smartphones sensors), turning the combined cameras into a single, light weight, high quality, highly synchronized and aligned multi-spectral imaging and processing mobile platform and when using a Smartphone design, with multiple wired and wireless communication capabilities.

As each camera is capable of capturing 3 narrow bands, due to the Bayer matrix of the sensor, the current invention allows capturing multi spectral images of four to twelve and even more bands, through multiple (two to four) cameras.

Figure 11:
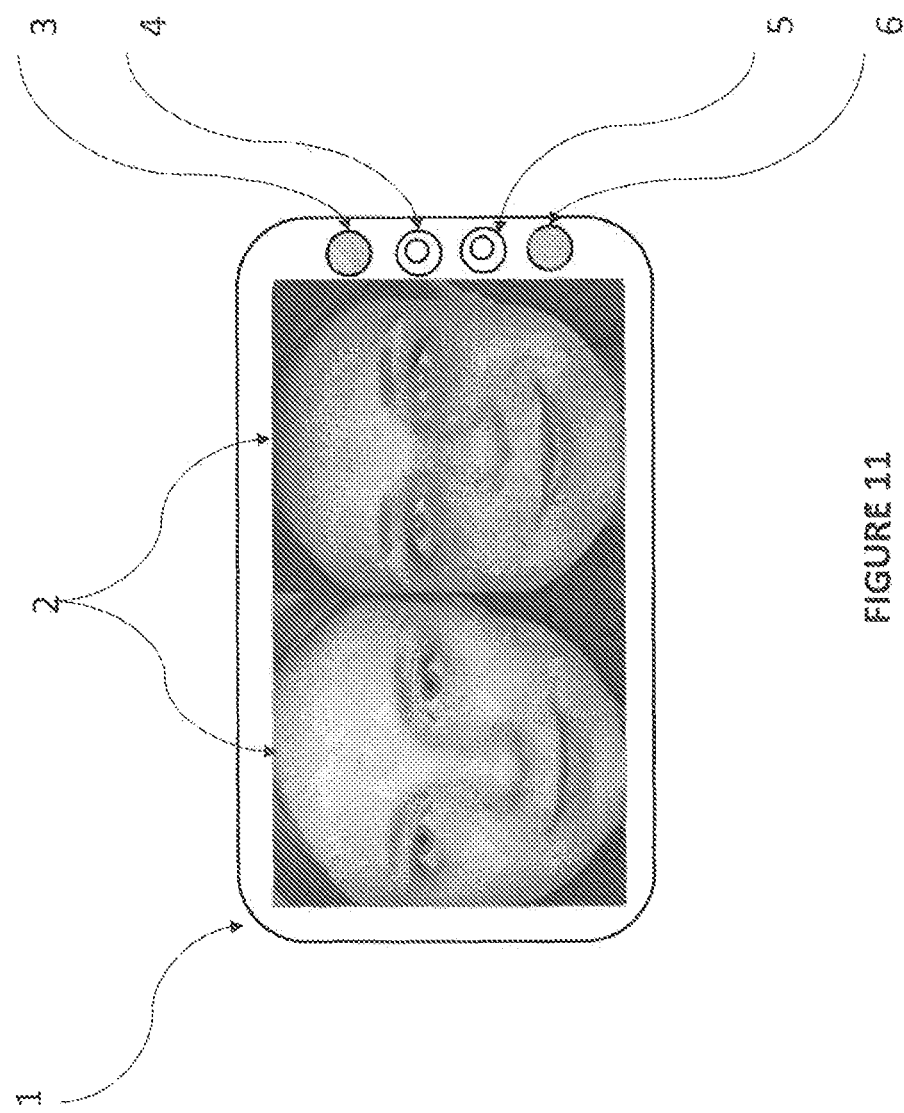
FIG. 11 is a schematic illustration of a multispectral mobile phone according to some embodiments of the current invention.

In one possible embodiment of the current invention, as exemplified in FIG. 11, for skin analysis purposes, the two cameras 4 and 5 will be placed close to each other on a smartphone 1 or similar mobile platform for simultaneous image capturing. Each camera will preferably have a dedicated LED flash 3, 6 matching the captured bandwidth of each filter of the camera—365 nm-370 nm black-light flash for the NUV camera, and visual light flash for the visible light camera. Preferably each camera is arranged to capture also a similar band of the spectrum (at least 50% overlap), here shown as a green band, to enable digital alignment of color or frequency bands in the captured images, as described above with reference to the imaging apparatus having the lens compound.

For easy skin analysis image capturing, the cameras will be installed on the side of the screen, allowing the user to see the camera's field of view, as done today when taking selfies (as can be seen in FIG. 11). The acquired images could be presented side by side or separately, according to the user's preference.

The integration with a platform capable of processing data will allow for both agricultural and skin analysis implementation, on-board real-time and off-line analysis of the acquired imagery using common analyzing tools, such as NDVI, NDRE, or skin analysis software.

The narrow or wide bandpass and/or multiple bandpass filters associated with each lens are different for each lens. They can be implemented as a coating on the lens, and/or mounted in front of the lens (between the object and the lens), or behind it (between the lens and the sensor which senses the light passing through that particular lens), all as known.

The images from the multiple lenses or cameras can be saved in a single image file or as two matching files, whether in RAW, JPEG or any other format supported by the camera.

Thus, the mobile imaging apparatus of the current invention permits implementation of the above-described method of post-acquisition aligning of different color matrices, in a most reliable way that no conventional multi-lens multi-spectral camera is capable of offering. As described above, these embodiments of the current invention allow pixel accurate alignment of the matrices, by capturing one of the color bands through both lenses, and aligning all the matrices according to the post-acquisition digital alignment, which is based on the matching of these two similar color matrices. For example, if lens/camera 1 captures 60 nm wide bands, the center of which are 450 nm, 550 nm and 650 nm, and lens/camera 2 captures 60 nm wide bands of 550 nm and 850 nm, then the post-acquisition digital alignment will be done by matching the two 550 nm images of lens 1 and lens 2, which will allow pixel accurate alignment, as these matrices contain similar data. This is accomplished by acquiring images, through filters which include a substantially identical light band, by each of the lenses. The matrix or channel which received the substantially identical light band is split from the multi-band images acquired by the different lenses/cameras. Then, the substantially identical light band matrix is utilized for post-acquisition digital alignment of the images acquired by all the lenses/cameras.

All the other matrices will then be aligned accurately, as they were captured simultaneously with the 550 nm on both halves of the sensor. It is possible, of course, to have a similar band for such alignment using any of the RGB range bands, however the preferable choice will be of green, as usually the green color matrix is the sharpest of the three color ranges and most cameras are equipped with the Bayer RGGB sensor, which ensures the highest quality for the green band.

It will be appreciated that the mobile imaging platform has wireless capabilities (e.g., WiFi, Bluetooth and/or cellular LIE or other) as provided in the mobile platform. If desired, the cameras can be controlled via USB or wirelessly. Similarly, the cameras are capable of transferring captured images through wire (e.g., USB) and/or wirelessly to a processing platform (such as a computer, tablet, PC, image processing board, or a smartphone).

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A multispectral imaging apparatus for capturing multispectral images, comprising:

A lens compound for connecting to an interchangeable lens mount of a digital camera having a single image sensor, the lens compound comprising:

a body;

a single mount connecting ring mounted on said body for connecting to the lens mount of the digital camera;

at least two lenses of substantially identical focal length, substantially identical field of view and substantially identical image circle at a sensor plane of the camera for acquiring color matrices of digital images of an object through each lens, mounted in said body;

a different single or multi bandpass filter associated with each of said lenses, allowing the passage of at least one visible band and one non-visible band, selected from the group consisting of near infra-red bands and ultra violet bands of light, through the filters to the sensor; and a processing platform for post-acquisition digital alignment of at least a pair of digital images of an object, including:

a processor for splitting the color matrix which was captured by the similar light band from the multi-band images acquired by the different lenses and matching the substantially identical light band matrices from each lens for post-acquisition digital alignment of the images acquired by all the lenses.

2. The multispectral imaging apparatus according to claim 1, wherein the filters are selected to allow the passage of at least four different bands of the spectrum through said lenses.

3. The multispectral imaging apparatus claim 1, wherein the filters are selected to allow the passage of one similar band of the spectrum through both lenses, enabling post acquisition alignment of color matrices of both lenses based on matching of the similar band acquired by both lenses.

4. The multispectral imaging apparatus according to claim 3, wherein chromatic aberration is corrected by at least one of:
   positioning the lenses at slightly different distances from the sensor; or
   including, in at least one of the lenses, an optical element that aligns the size of the image circle of one lens with that of the other lens.

5. The multispectral imaging apparatus according to claim 1, further comprising a light blocking frame disposed between the lenses or attached to the sensor.

6. The multispectral imaging apparatus according to claim 5, wherein the light blocking frame is selected from the group including a masking window, a border, and a partition disposed between lenses or attached to the sensor, or a combination of these.

7. The multispectral imaging apparatus according to claim 1, wherein each said lens is positioned in front of a center of the portion of the sensor associated therewith.

8. The multispectral imaging apparatus according to claim 1, wherein said filter is implemented as at least one of the following: a coating, a filter mounted in front of the lens, a filter mounted behind the lens, and a filter mounted above the portion of the sensor which senses the light passing through a particular lens.

9. The multispectral imaging apparatus according to claim 1, further comprising a single focus mechanism for simultaneously adjusting focus of all the lenses.

10. The multispectral imaging apparatus according to claim 1, further including at least one Porro prism design associated with each lens.

11. A method for capturing multispectral images and digitally aligning said images, the method comprising:
    capturing images on a single image sensor through at least two lenses of substantially identical focal length, wherein the lenses are of substantially identical field of view and substantially identical image circle at a sensor plane;
    each said lens being associated with a different single or multi bandpass filter;
    passing at least one visible band and at least one non-visible band, through said filters to the sensor;
    acquiring said images, through said filters which permit passage of a similar light band, by each of the lenses;
    saving said captured images from the multiple lenses in a single image file;
    splitting a matrix which was captured by the similar light band from the multi-band images acquired by the different lenses;
    matching the substantially identical light band matrices from each lens; and
    digitally aligning the images acquired by all the lenses utilizing the similar light band matrices.

12. The method according to claim 11, wherein the step of passing includes passing at least four different spectral bands through said filters.

13. The method according to claim 11, further comprising correcting chromatic aberration by at least one of: positioning the lenses at unequal distances from the sensor, or including, in at least one of the lenses, an optical element that aligns the size of the image circle of one lens with that of the other lens.

14. The method according to claim 11, further comprising cropping the lenses to prevent overlap of images.

15. The method according to claim 11, further including independently calibrating focus for each lens.

16. The method according to claim 11, further comprising balancing exposure levels of said lenses by a method selected from the group including: a) pre-setting size of apertures (F stops) of said lenses according to wavelengths for acquisition during a same exposure time; b) Adding neutral density coating or filter to the VIS lens; c) manually set apertures/iris setting/F stop.

17. The method according to claim 11, wherein said non-visible band is selected from the group consisting of near infra-red bands and near ultra violet bands of light.

18. A multi spectral camera comprising:
    a digital camera having an interchangeable lens mount, a shutter and a single sensor; and
    a replaceable lens compound including:
      a body;
      a single mount connecting ring mounted on said body for connecting to the lens mount of the digital camera;
      at least two lenses of substantially identical focal length, substantially identical field of view and substantially identical image circle at a sensor plane of the camera mounted in said body, each said lens mounted with its focal center disposed in front of the center of its respective portion of the sensor;
      a different single or multi bandpass filter associated with each of said lenses, allowing passage of at least one visible band and at least one non-visible band, selected from the group consisting of near infra-red bands and ultra violet bands of light, through said filters to the sensor;
    a processing platform for post-acquisition digital alignment of at least a pair of digital images of an object, including:
    a processor for splitting the color matrix which was captured by the similar light band from the multi-band images acquired by the different lenses and matching the substantially identical light band matrices from each lens for post-acquisition digital alignment of the images acquired by all the lenses.

19. The camera according to claim 18, wherein the filters are selected to allow the passage of at least four different bands of the spectrum through said lenses.

20. The camera according to claim 19, wherein chromatic aberration is corrected by at least one of:
    positioning the lenses in the compound at unequal distances from the sensor so that focal point of each lens coincides with a focal plane of the sensor; or
    including in at least one of the lenses an optical element that aligns the size of the image circle of one lens with that of the other lens; or
    selecting said lenses with slightly different focal length, and disposing them in the compound with an identical angle of view and image circle.

21. The camera according to claim 18, further comprising a light blocking frame disposed between the lenses or attached to the sensor.

22. A method for providing post-acquisition digital alignment of at least a pair of digital images of an object, the method comprising:
    acquiring digital images of the object, stored as color matrices, through each of at least two lenses of substantially identical focal length, of substantially identical field of view and substantially identical image circle at a sensor plane of at least one sensor;
    each said lens being associated with a single or multi bandpass filter, such that each lens captures one light band similar to one light band captured by the other said lens and at least one light band different from the light bands captured by the other said lens;

splitting the color matrix which was captured by the similar light band from the multi-band images acquired by the different lenses; and matching the substantially identical light band matrices from each lens for post-acquisition digital alignment of the images acquired by all the lenses.

23. The method according to claim 22, wherein the filters allow the passage of at least a visible and a non-visible band of light through the filters to the sensor.

24. The method according to claim 23, further comprising a flash light matching the pass band of the non-visible filter, arranged to illuminate an object for imaging.

25. The method according to claim 24, further comprising a second flash light matching the pass band of the visible filter, arranged to illuminate the object for imaging.

26. Apparatus for providing post-acquisition digital alignment of at least a pair of digital images of an object, the apparatus comprising:

at least two lenses of substantially identical focal length, of substantially identical field of view and substantially identical image circle at a sensor plane, for acquiring color matrices of digital images of an object through each lens;

each said lens being associated with a single or multi bandpass filter which includes one similar light band and at least one different light band; and a processor for splitting the color matrix which was captured by the similar light band from the multi-band images acquired by the different lenses and matching the substantially identical light band matrices from each lens for post-acquisition digital alignment of the images acquired by all the lenses.

27. The apparatus according to claim 26, wherein the filters allow the passage of at least one visible and one non-visible band of light through the filters to the sensor.

28. The apparatus according to claim 27, further comprising a flash light matching the pass band of the non-visible filter arranged to illuminate the object during image acquisition.

29. The apparatus according to claim 28, further comprising a second flash light matching the pass band of the visible filter arranged to illuminate the object during image acquisition.

30. A multispectral imaging apparatus comprising:
a mobile processing platform;
at least two cameras integrated with the platform, each camera including:
at least one sensor;
a lens of substantially identical focal length, similar field of view and substantially similar image circle at the sensor plane of the camera for acquiring color matrices of digital images of an object through each lens;
at least one single or multi bandpass filter allowing the passage of at least one visible and one non-visible band of light through the filters to the sensor; and
a processing platform for post-acquisition digital alignment of at least a pair of digital images of an object, including:
a processor for splitting the color matrix which was captured by the similar light band from the multi-band images acquired by the different lenses and matching the substantially identical light band matrices from each lens for post-acquisition digital alignment of the images acquired by all the lenses.

31. The apparatus according to claim 30, further comprising a flash light matching the non-visible pass band of the filters, arranged to illuminate an object for imaging.

32. The apparatus of claim 31, further comprising a second flash light matching the visible pass band of the filters, arranged to illuminate the object for imaging.

33. The apparatus according to claim 31, wherein the flash light matching the non-visible pass band is a dedicated flash light.

34. The apparatus according to claim 30, wherein said at least one sensor includes two sensors integrated with the platform, each sensor associated with at least one of said lenses and at least one of said filters.

35. The apparatus according to claim 30, wherein all the lenses include a filter to capture at least one similar color band of the spectrum, enabling digital alignment of different color channels in the captured images.

36. The multispectral imaging apparatus according to claim 30, wherein each said filter is implemented as at least one of the following: a coating, a filter mounted in front of the lens, a filter mounted behind the lens, and a filter mounted above the portion of the sensor which senses the light passing through a particular lens.

37. A method for capturing multispectral images and aligning said images, the method comprising:

capturing images by a multispectral imaging apparatus on a mobile processing platform through at least two lenses, at least two filters, and at least one sensor integrated with the platform;

wherein the at least two filters allow the passage of at least a visible and a non-visible (near infra-red or ultra violet) band of light through the filters to the sensor;

wherein the lenses are of substantially identical focal length, similar field of view and substantially identical image circle at a sensor plane;

each said lens being associated with a different single or multi bandpass filter;

passing at least one visible band and at least one non-visible band, selected from the group consisting of near infra-red bands and ultra violet bands of light, through said filters to the sensors;

passing at least one similar color band of the spectrum through each said lens, enabling digital alignment of different color channels in the captured images-;

acquiring images, through said filters which include a substantially identical light band, by each of the lenses;

splitting a matrix which received the substantially identical light band from the multi-band images acquired by the different lenses; and utilizing the substantially identical light band matrix for post-acquisition digital alignment of the images acquired by all the lenses.

38. The method according to claim 37, further comprising illuminating an object to be imaged with a flash light matching the non-visible pass band.

39. The method according to claim 38, wherein the flash light is a dedicated flash light.

* * * * *